(12) United States Patent
Lee

(10) Patent No.: US 11,155,176 B2
(45) Date of Patent: Oct. 26, 2021

(54) INTELLIGENT AUTONOMOUS ELECTRICAL VEHICLE PLATFORM SYSTEM FOR CARGO TRANSPORT AND MOBILE HOUSING

(71) Applicant: Edward Lee, Irvine, CA (US)

(72) Inventor: Edward Lee, Irvine, CA (US)

( * ) Notice: Subject to any disclaimer, the term of this patent is extended or adjusted under 35 U.S.C. 154(b) by 338 days.

(21) Appl. No.: 16/450,554

(22) Filed: Jun. 24, 2019

(65) Prior Publication Data
US 2020/0398690 A1 Dec. 24, 2020

(51) Int. Cl.
| | |
|---|---|
| *B60L 53/51* | (2019.01) |
| *G05D 1/00* | (2006.01) |
| *B60P 3/00* | (2006.01) |
| *A61G 3/00* | (2006.01) |
| *B60P 3/32* | (2006.01) |
| *B60K 7/00* | (2006.01) |
| *B60L 50/50* | (2019.01) |

(Continued)

(52) U.S. Cl.
CPC ............ *B60L 53/51* (2019.02); *A61G 3/001* (2013.01); *B60L 1/14* (2013.01); *B60L 50/50* (2019.02); *B60P 3/0257* (2013.01); *B60P 3/32* (2013.01); *G05D 1/0011* (2013.01); *G05D 1/0088* (2013.01); *B60K 7/0007* (2013.01); *B60L 2200/36* (2013.01); *B60L 2210/40* (2013.01); *B60L 2220/44* (2013.01); *B60Y 2200/91* (2013.01)

(58) Field of Classification Search
CPC .......... A61G 3/001; B60K 1/04; B60K 16/00; B60K 17/356; B60K 2001/0438; B60K 2016/003; B60K 7/0007; B60P 3/0257; B60P 3/32; B60L 1/14; B60L 2200/36; B60L 2210/40; B60L 2220/44; B60L 2260/32; B60L 50/50; B60L 53/14; B60L 53/51; B60L 8/003; B60Y 2200/1422; B60Y 2200/91; G05D 1/0011; G05D 1/0088

See application file for complete search history.

(56) References Cited

U.S. PATENT DOCUMENTS

| | | | |
|---|---|---|---|
| 6,022,067 A * | 2/2000 | Hargett | B60J 5/08 296/155 |
| 10,479,418 B1 * | 11/2019 | Patel | G05D 1/0088 |
| 11,046,230 B2 * | 6/2021 | Zuckerman | G05D 1/021 |

(Continued)

*Primary Examiner* — Tyler J Lee

(57) ABSTRACT

An intelligent autonomous electrical vehicle platform assembly provides a mobile platform that comprises a self-motorized, electrical power drive to carry at least one platform container or passenger vehicle while being controlled remotely by an operator, or autonomously driven through artificial intelligence, or operated in a shared transportation system. The mobile platform has a platform chassis having wheels with a hub motor assembly contained therein. The hub motor is powered electrically from a battery charged by an external power source and/or a solar panel. The mobile platform carries a platform container that forms an enclosed area with various themes, including: a cargo transport area, a food and beverage area, a medical assistance area, or a home area having an inhabitant-assigned parking area and utility. The inhabitant of the mobile home receives creature comforts of a home environment, and controls movement, parking, energy, temperature, and payment options for the mobile home.

20 Claims, 15 Drawing Sheets

(51) Int. Cl.
*B60L 1/14* (2006.01)
*B60P 3/025* (2006.01)

(56) References Cited

U.S. PATENT DOCUMENTS

| | | | |
|---|---|---|---|
| 2014/0054339 A1* | 2/2014 | Smith | B60R 9/06 224/404 |
| 2015/0202770 A1* | 7/2015 | Patron | G06Q 20/386 700/245 |
| 2017/0308098 A1* | 10/2017 | Yu | G05D 1/024 |
| 2019/0121368 A1* | 4/2019 | Bussetti | G05D 1/0088 |

* cited by examiner

1800

1900

INTELLIGENT AUTONOMOUS ELECTRICAL VEHICLE PLATFORM SYSTEM FOR CARGO TRANSPORT AND MOBILE HOUSING

FIELD OF THE INVENTION

The present invention relates generally to an intelligent autonomous electrical vehicle platform assembly for cargo transport and mobile housing. More so, the present invention relates to an autonomous mobile platform that has a self-motorized electrical power configuration and that carries at least one cargo container or passenger vehicle while being controlled remotely by an operator, autonomously driven through artificial intelligence, or operated in a shared transportation system; whereby the mobile platform carries a mobile home container having an inhabitant-assigned parking area and utility that provides the inhabitant of the mobile home container with the creature comforts of a home environment, while also allowing the inhabitant to control movement, parking, energy, temperature, and payment options for the mobile home container; and whereby a software program downloadable on the inhabitant's mobile communication device controls operation and charging of the mobile platform.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, electrical vehicles operate on battery power that is charged through charging stations and external power units. The electrical vehicles does not use an internal combustion engine alone or in combination with a battery to form a hybrid system. Often, a communication interface system is included in the electric vehicle to provide a complete plug since the electric vehicle relies exclusively on battery power to propel the vehicle is needed.

The rechargeable batteries that supply driving power to the electric vehicle form a considerable amount of the space and weight of the total vehicular weight and bulk, thereby restricting transport capacity of the vehicle which would be otherwise left available. Also, it is known in the art that the cattery capacity determines the driving range of the vehicle. Further, in recharging drained batteries, it becomes obligatory that the electric vehicle be rendered immobile for several hours on the average. This traditionally requires a stationary charging point, which may not always be available.

Other proposals have involved electrical, autonomous vehicles. The problem with these gripping devices is that they do not carry different types of vehicles. Also, they are not both remotely and autonomously controllable. Even though the above cited electrical, autonomous vehicles meet some of the needs of the market, an autonomous mobile platform that has a self-motorized electrical power configuration and that carries at least one cargo container or passenger vehicle while being controlled remotely by an operator, autonomously driven through artificial intelligence, or operated in a shared transportation system; whereby the mobile platform carries a mobile home container having an inhabitant-assigned parking area and utility that provides the inhabitant of the mobile home container with the creature comforts of a home environment, while also allowing the inhabitant to control movement, parking, energy, temperature, and payment options for the mobile home container; and whereby a software program downloadable on the inhabitant's mobile communication device controls operation and charging of the mobile platform, is still desired.

SUMMARY

Illustrative embodiments of the disclosure are generally directed to an intelligent autonomous electrical vehicle platform assembly for cargo transport and mobile housing. The vehicle platform assembly provides a mobile platform that comprises a self-motorized electrical power drive configuration and that is configured to carry at least one cargo container or passenger vehicle while being controlled remotely by an operator, or autonomously driven through artificial intelligence, or operated in a shared transportation system. The mobile platform has a platform chassis having wheels with a hub motor assembly contained therein. The hub motor is powered electrically from a battery charged by an external power source and/or a solar panel.

In some embodiments, the mobile platform carries a platform container that forms an enclosed area that can have various themes. The platform container may include: a cargo transport area, a food and beverage area, a medical assistance area, or a home area having an inhabitant-assigned parking area and utility fixture. The mobile home container provides the inhabitant of the mobile home container with the creature comforts of a home environment, while also allowing the inhabitant to control different aspects of the mobile home container, including: movement, parking, energy, temperature, and payment options for the mobile home container. A software program downloadable on the inhabitant's mobile communication device controls operation and charging of the mobile platform.

In one aspect, an intelligent autonomous electrical vehicle platform assembly for cargo transport and mobile housing, comprises:
at least one mobile platform having:
a platform chassis defined by a front end, a rear end, a platform support face, and a platform under face, the platform chassis comprising at least one front wheel disposed near the front end and at least one rear wheel disposed near the rear end, the front and rear wheels being operable with a wheel hub assembly;
at least one suspension system operatively connected to at least one of the front and rear wheels;
at least one hub motor operational with the wheel hub assembly, each hub motor operational to drive a respective wheel, the hub motor being operational with electrical energy;
a battery operatively connected to the hub motor, the battery generating electrical energy;
a charge port being operatively connected to the battery, the charge port operable to enable passage of an electrical charge;
an illumination portion;
and a computer having a software program;
whereby the software program is operational to control at least one of the following: the hub motor, the illumination portion, the battery; and
at least one platform container detachably coupled and aligned longitudinally with the mobile platform, the platform container operable to contain at least one container item, or a passenger, or both, the platform container having:
  a container base wall detachably mated with the platform support face;
  a container roof wall disposed in a spaced-apart, parallel relationship with the container base wall;
  a sidewall disposed to enclose, with the container base wall and the container roof wall, a cavity; and
  at least one gate being operable in the sidewall, the gate regulating access to the cavity.

In another aspect, the mobile platform comprises at least one solar panel disposed on the platform chassis, the solar panel being operatively connected to the battery for recharging the battery.

In another aspect, the mobile platform comprises a power inverter operable to convert direct current to alternating current.

In another aspect, the charge port enables passage of a cable for charging the battery.

In another aspect, the software program is operable on a mobile communication device.

In another aspect, the mobile communication device is operable by a user to control movement of the mobile platform.

In another aspect, the software program enables autonomous operation by the mobile platform.

In another aspect, the software program is defined by artificial intelligence.

In another aspect, the software is in communication with firmware, a remote server, and a customer service department.

In another aspect, the mobile platform comprises a steering member operatively connected to the front wheel, or the rear wheel, or both.

In another aspect, the at least one front wheel comprises two wheels.

In another aspect, the at least one rear wheel comprises two wheels.

In another aspect, the mobile platform comprises a regenerative electric braking circuit being operatively connected to the hub motor, whereby the electric braking circuit causes electric braking of the front wheel, or the rear wheel, or both, whereby the hub motor generates a back electromotive force that feeds the battery.

In another aspect, the hub motor is encompassed inside the front wheel, or the rear wheel, or both.

In another aspect, the illumination portion comprises an LED light.

In another aspect, the platform container is defined by a forward container end and a rearward container end.

In another aspect, the gate is disposed at the forward container end or the rearward container end.

In another aspect, the gate comprises a lock.

In another aspect, the cavity in the platform container is defined by a food and drink dispensing area, whereby the container item includes at least one of the following: a food, a beverage, a glass, a plate, a cooking utensil, and an eating utensil, and whereby the passenger includes at least one of the following: a cook, a server, and a host.

In another aspect, the cavity in the platform container is defined by a medical assistance dispensing area, whereby the container item includes at least one of the following: a bed, a medicine, a bandage, and whereby the passenger includes at least one of the following: a medical professional and a patient.

In another aspect, the cavity in the platform container is defined by a home, whereby the container item includes at least one of the following: a bed, a table, a sofa, a light, a sink, a cooking device, and a toilet, and whereby the passenger includes an inhabitant.

One objective of the present invention is to provide an autonomous mobile platform that carries variously sized and themed platform containers.

Another objective is to provide illumination that has a color of lights that automatically adjust to signal the front of the mobile platform with a bright white, and the rear end of the mobile platform with red pigment.

Another objective is to create a clean energy semi-truck rig that emits zero emissions.

Another objective is to provide a modular tractor unit with interchangeable body components.

Another objective is to power the tractor unit with solar cell assemblies on the tractor roof and on a semi-trailer roof.

Yet another objective is to allow the driver to sit in a central position in the interior tractor cabin to enhance viewing the environment around the tractor unit and the semi-trailers.

Yet another objective is to allow the interior tractor cabin to be customizable, similar to a home or office interior.

Yet another objective is to provide an inexpensive to manufacture electrical vehicular system for powering a mobile platform that carries cargo containers powered with solar energy.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 2A shows a cargo-type platform container, FIG. 2B shows a mobile platform, and FIG. 2C shows the cargo-type platform container being carried by the mobile platform, in accordance with an embodiment of the present invention;

FIG. 4A shows a vehicle-type platform container, FIG. 4B shows a mobile platform, and FIG. 4C shows the vehicle-type platform container being carried by the mobile platform, in accordance with an embodiment of the present invention;

Like reference numerals refer to like parts throughout the various views of the drawings.

DETAILED DESCRIPTION OF THE INVENTION

Figure 1:
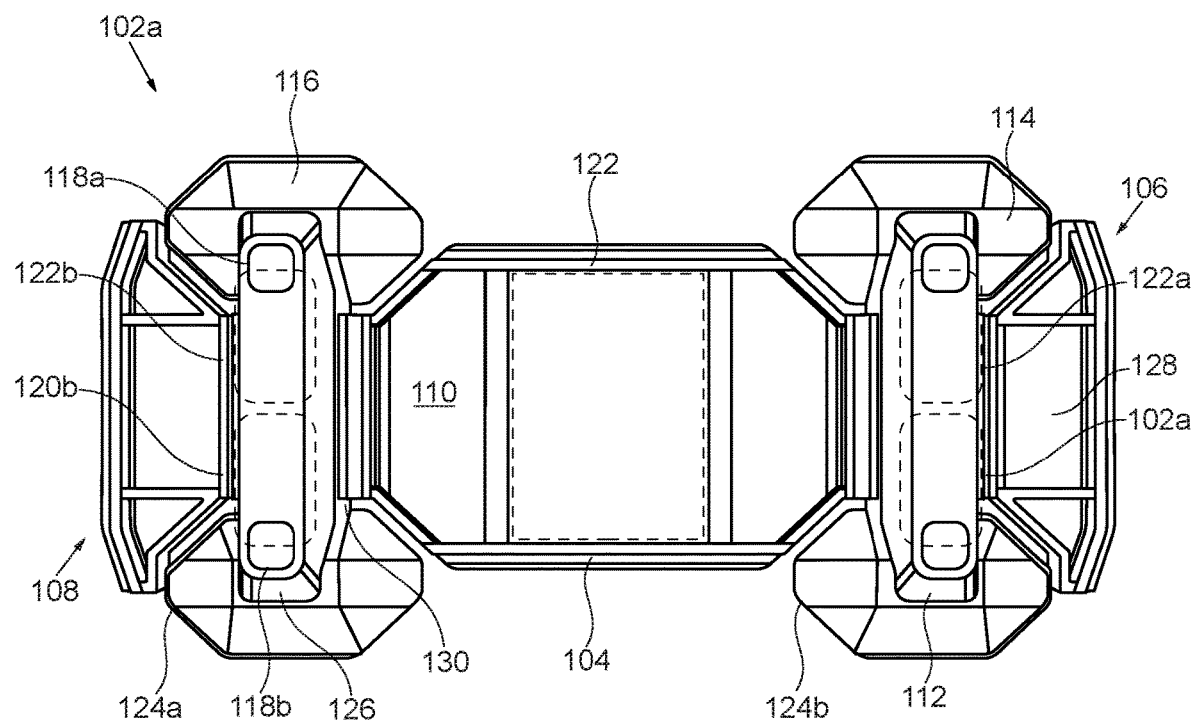
FIG. 1 illustrates a perspective view of an exemplary mobile platform of an intelligent autonomous electrical vehicle platform assembly for cargo transport and mobile housing, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An intelligent autonomous electrical vehicle platform assembly 100 for cargo transport and mobile housing is referenced in FIGS. 1-20. The intelligent autonomous electrical vehicle platform assembly 100, hereafter "assembly 100", includes at least one mobile platform 102a that is autonomous, self-motorized, and remotely operable to carry a load, such as at least one platform container 200a. The assembly 100 provides a mobile platform 102a that is configured with a self-motorized, electrical power drive to carry the at least one platform container 200a, or even a passenger vehicle. The mobile platform 102a is controlled remotely by an operator, or autonomously driven through artificial intelligence, or operated in a shared transportation system. Continuing, the mobile platform 102a has a platform chassis 104 having wheels with a hub motor assembly 100 contained therein. The hub motor is powered electrically from a battery 122 charged by an external power source and/or a solar panel.

The primary purpose of the mobile platform 102a is to carry a platform container 200a. The platform container 200a detachably mates with the mobile platform 102a in an aligned, coupled configuration. In some embodiments, the platform container 200a forms an enclosed area that can take any number of functions. This can include a cargo transport function, a food and beverage function, a medical assistance function, or a home function.

As FIG. 1 references, the mobile platform 102a comprises a platform chassis 104. The platform chassis 104 is defined by a generally flat configuration that maximizes surface area for carrying the largest possible loads. In one possible embodiment, the platform chassis 104 comprises a front end 106 oriented towards a forward movement, and a rear end 108 oriented towards a rearward movement. The platform chassis 104 also includes a platform support face 110 oriented away from a ground surface, and a platform under face 132 oriented towards a ground surface. In one embodiment, the platform chassis 104 is configured as a supportive, rigid frame that has sufficient strength and flexibility to support a heavy load, along with torque, axial forces, and bend associated with a moving vehicle. Suitable materials for the mobile platform 102a may include, without limitation, aluminum, steel, metal alloys, and composites.

Further, the platform chassis 104 comprising at least one front wheel 114 that is disposed near the front end 106 of the mobile platform 102a. The at least one front wheel 114 may include two parallel, steerable wheels. However other numbers of front wheels may also be used. The platform chassis 104 also provides at least one rear wheel 116 that is disposed near the rear end 108 of the mobile platform 102a. Both the front and rear wheel 116 s are operable with a wheel hub assembly 126. In one non-limiting embodiment, the assembly provides two front wheels, and two rear wheels. Though nay number of wheels, slides, tracks, and other motion-inducing mechanisms known in the art may be used.

In one embodiment, a steering member 130 operatively connects to the front wheel 114, or the rear wheel 116, or both. The steering member 130 may include a rack and pinion, an axle, a manual steering wheel, and a CV-joint. Furthermore, at least one suspension system 118a, 118b operatively connects to at least one of the front and rear wheels 114, 116. The suspension system 118a, 118b may include tires, tire air, springs, shock absorbers, and linkages that connect the platform chassis 104 to the wheels 114, 116.

Looking back at FIG. 1, at least one hub motor 120a, 120b is operational with the wheel hub assembly 126. The wheel hub assembly 126 may include an axle, CV-joint, and other mechanisms known in the art to move a vehicle. Each hub motor 120a, 120b is operational to drive a respective wheel. The unique aspect of the hub motor 120a, 120b is that is operational with electrical energy. In one non-limiting embodiment, the hub motor 120a, 120b has a coil that generates an electromagnetic field that is supplied to stationary windings of the hub motor 120a, 120b. As is known in the art, the outer part of the hub motor 120a, 120b follows, or tries to follow, those fields, turning the attached wheel.

As discussed above, the mobile platform 102a is configured with an electrical power-drive. This requires a battery 122 that operatively connects to the hub motor 120a, 120b. In one embodiment, the battery 122 generates electrical energy directly for powering the hub motor 120a, 120b. The battery 122 may include, without limitation, a lead-acid battery, a nickel metal hydride, a lithium-ion battery. Looking back at FIG. 1, the mobile platform 102a provides a charge port 112 that is operatively connected to the battery 122. The charge port 112 is operable to enable passage of an electrical charge, such as through a charging cable known in the art of rechargeable electrical vehicles. This may include a 240-volt wall outlet with charging cable.

Figure 11:
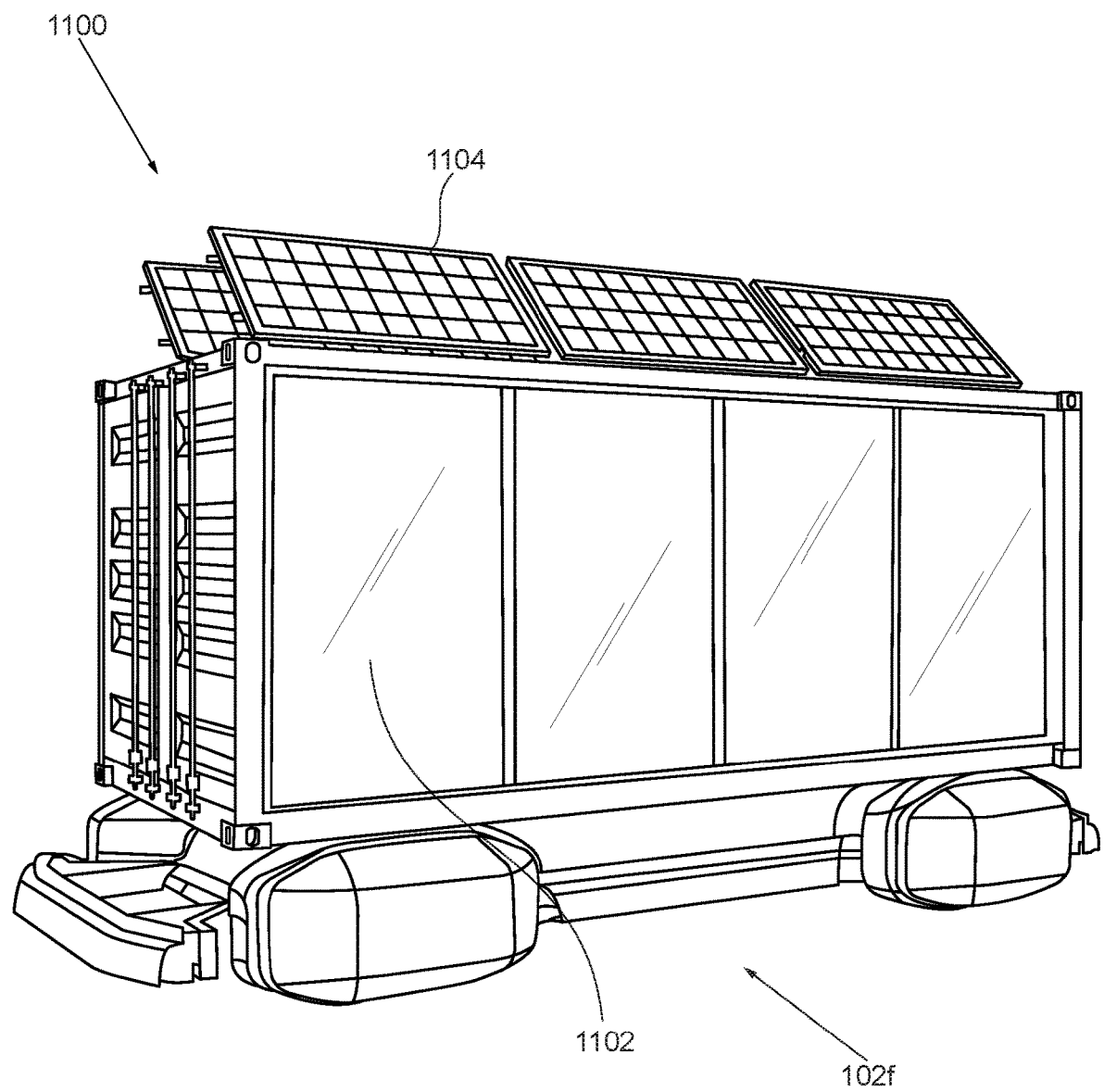
FIG. 11 illustrates an exemplary home platform container, in accordance with an embodiment of the present invention.

In some embodiments, the mobile platform 102a may include at least one solar panel 128 that is disposed on the platform chassis 104 for recharging the battery 122. The solar panel 128 is operatively connected to the battery 122 for recharging the battery 122. In some embodiments, the solar panel may include a photovoltaic solar panel, known in the art. In another possible embodiment, the mobile platform 102a comprises a power inverter 122a, 122b that works to convert direct current to alternating current. However, as shown in FIG. 11, a solar panel 1104 may be disposed directly on a home platform container 1100.

Figure 8:
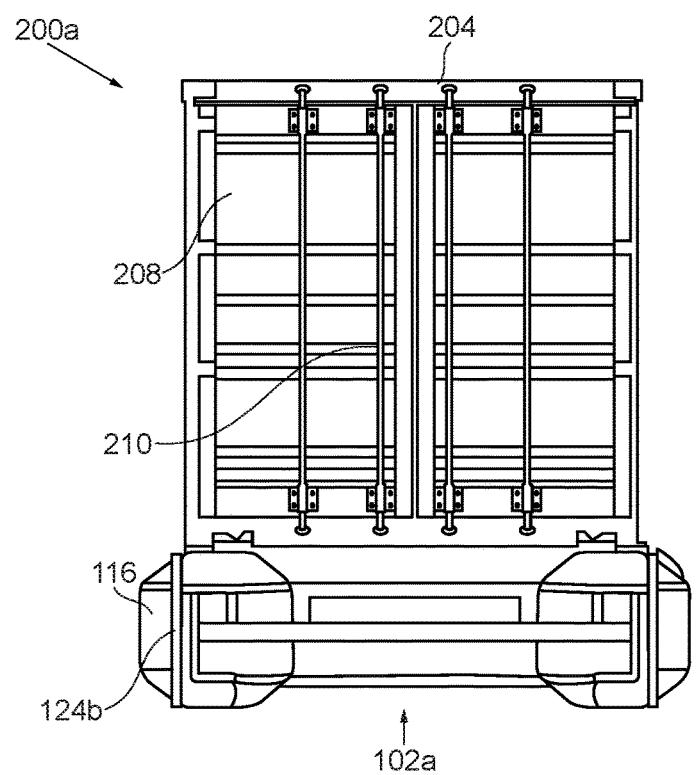
FIG. 8 illustrates a rear view of an exemplary mobile platform carrying a cargo-type platform container, in accordance with an embodiment of the present invention.

Since the mobile platform 102a is moving, and sometimes at night or during inclement weather, an illumination portion 124a-b may be used. The illumination portion 124a-b may include LED lights that trim the sides of the platform chassis 104, and specifically a first illumination portion 124a is a light that trims the front wheel, and a second illumination portion 124b is a light that trims the rear wheel (FIG. 8). The illumination portion 124a-b may also include front headlights, rear turn signals, and other lighting configurations known in the art of vehicle lighting.

In one non-limiting embodiment, the illumination portion 124a-b is configured with a color of lights that automatically adjust to signal the front of the mobile platform 102a with a bright white, and the rear end 108 of the mobile platform 102a with red pigment. In another embodiment, the illumination portion 124a-b comprises a horizontal lighting architecture. Consequently, the illumination portion 124a-b generates a horizontal beam of light that harmonizes the lower and upper body while creating a strong foundation of stability.

The mobile platform 102a, through a software program 500, utilizes intelligent programming to operate the mobile platform 102a and load the platform container 200a thereon. In one non-limiting embodiment, the mobile platform 102a, or a remote communication device, provides a computer 512 that operates a software program 500. The software program 500 is operational to control any one, or all of the hub motor 120a, 120b, the illumination portion 124a-b, the battery 122. For example, the communication device of a user 504 can power on and power off the hub motor 120a, 120b; power on and power off the illumination portion 124a-b; and check the battery power. In another embodiment, the software program 500 enables autonomous operation by the mobile platform 102a. In one possible embodiment, the software program 500 is defined by artificial intelligence logic, providing speech recognition, roadway memory, interior configuration memory, and other aspects known in the art.

Figure 5:
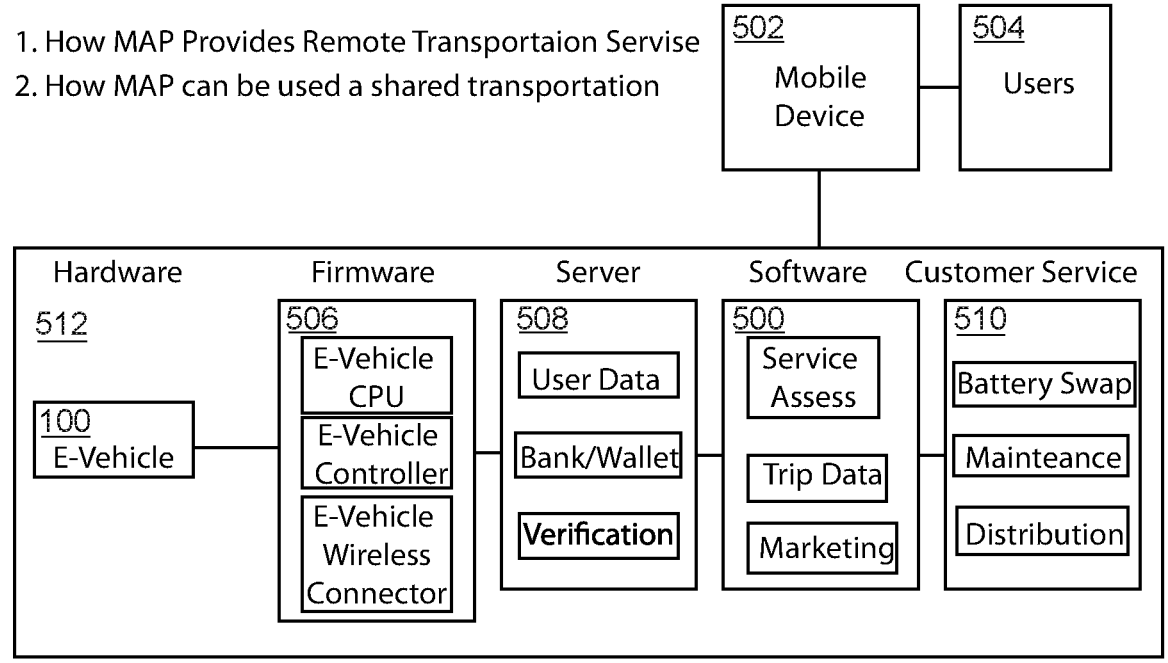
FIG. 5 illustrates a block diagram of a remote transportation and shared transportation system for the intelligent autonomous electrical vehicle platform assembly, in accordance with an embodiment of the present invention.
Figure 6:
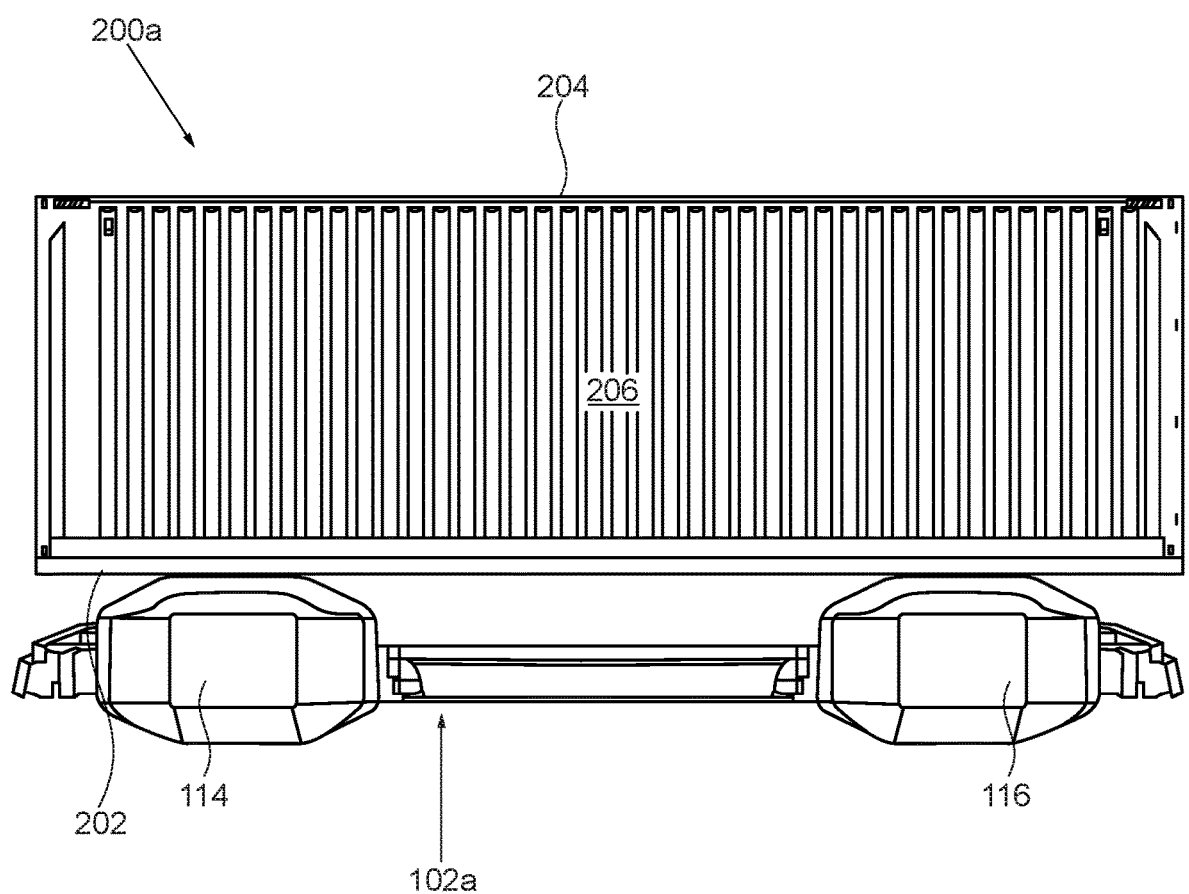
FIG. 6 illustrates a side view of an exemplary mobile platform carrying a cargo-type platform container, in accordance with an embodiment of the present invention.

As FIG. 5 references, the software program 500 is operable with a mobile communication device 502 of a user. Through the mobile communication device 502, the user 504 is in communication with a firmware 506, a remote server 508, and a customer service department 510. Such a communication network allows the user 504 to relay information and receive assistance during operation of the mobile platform 102a, or when the mobile platform 102a is not operating properly.

In some embodiments, the software program 500 may utilize tracking components and software known in the art, i.e., GPS, towers, etc. The programmable aspects of the mobile platform 102a are configurable to expand/upgrade software and hardware to integrate various technologies to support performance, safety, and convenience such as autonomous driving and have the ability to provide various functions fit for the user and/or infrastructure.

Figure 2A:
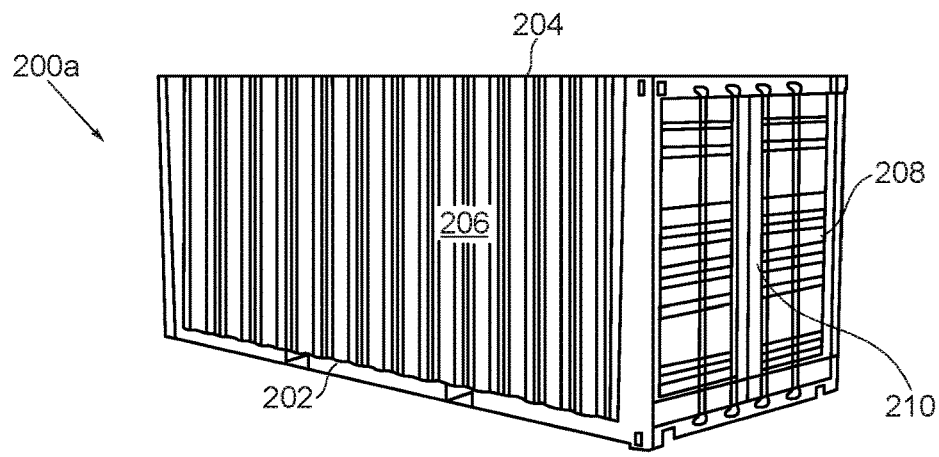
FIGS. 2A-2C illustrates perspective views of the electrical vehicle platform assembly, where

In some embodiments, the assembly 100 provides at least one platform container 200a that detachably couples and aligns longitudinally with the mobile platform 102a. FIG. 2A shows the platform container 200a in anticipated mating with a corresponding mobile platform 102a, shown in FIG. 2B. When mated together, the mobile platform 102a is in position to carry the platform container 200a in an autonomous manner. The combined assembly 100, shown in FIG. 2C, is effective for transporting at least one container item, or a passenger, or both. This allows for carrying items and people for multiple task, such as: sanitation, postal delivery, delivery of service and goods, cargo transport, mobile home, and food service.

Figure 2B:
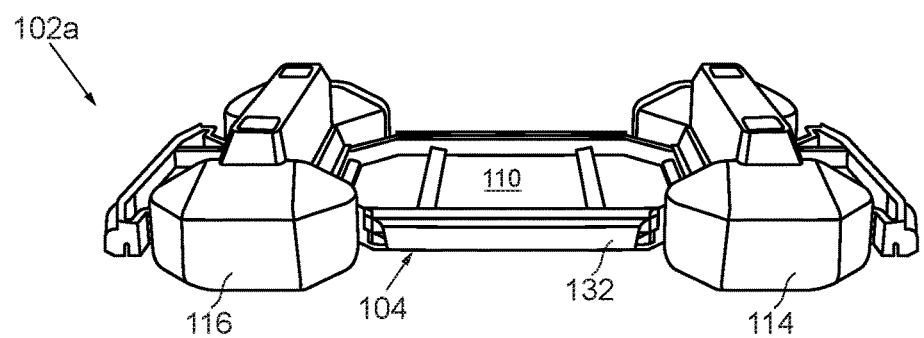
Figure 2C:
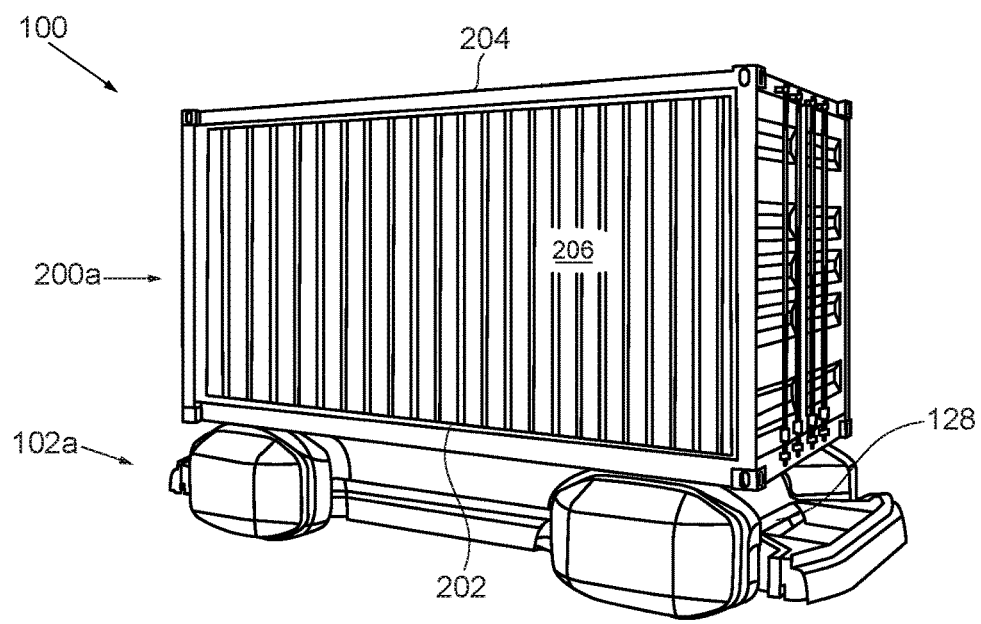
Figure 3:
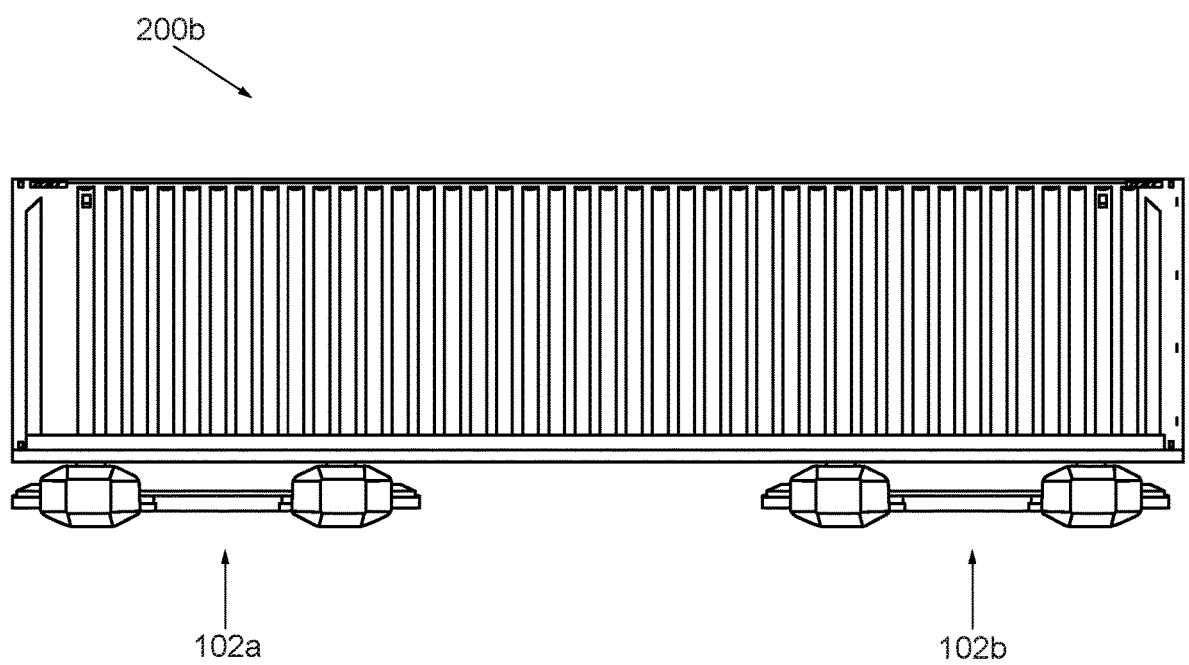
FIG. 3 illustrates a perspective view of two mobile platforms carrying a large platform container, in accordance with an embodiment of the present invention.

As illustrated in FIG. 2B, the platform container 200a may be a standard rectangular cargo container known in the art. In this configuration, the platform container 200a has a container base wall 202 that detachably mates with the platform support face 110. The platform container 200a also comprises a container roof wall 204 that is disposed in a spaced-apart, parallel relationship with the container base wall 202. This creates a height of at least 6' in one embodiment. Though other dimensions are possible. The platform container 200a also provides a sidewall 206 that is disposed to enclose, with the container base wall and the container roof wall, a cavity. It is significant to note that for a larger platform container 200b, two or more mobile platforms 102a, 102b may be used to transport the larger platform container 200b (FIG. 3).

In some embodiments, the platform container 200a includes at least one gate 208 that is operable in the sidewall to regulate access to the cavity. The gate allows access to the interior cavity of the platform container 200a, where items are stored and carried. In one embodiment, a lock 210 is used to prevent unauthorized entry through the gate 208.

Figure 4A:
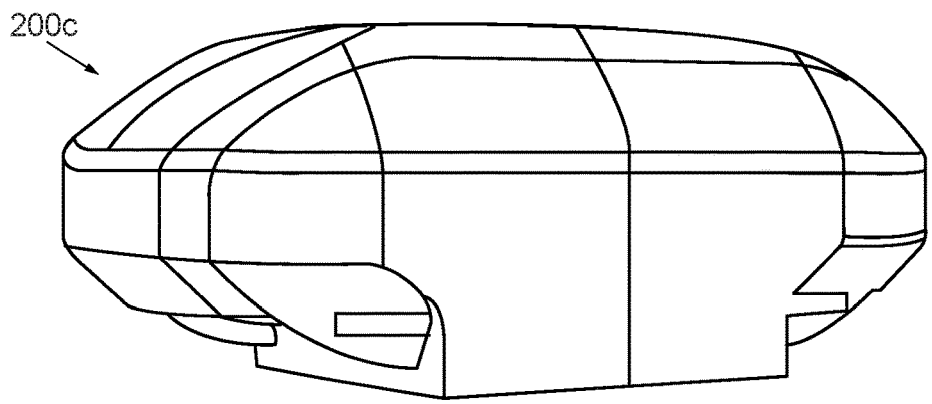
FIGS. 4A-4C illustrates perspective views of the electrical vehicle platform assembly, where
Figure 4B:
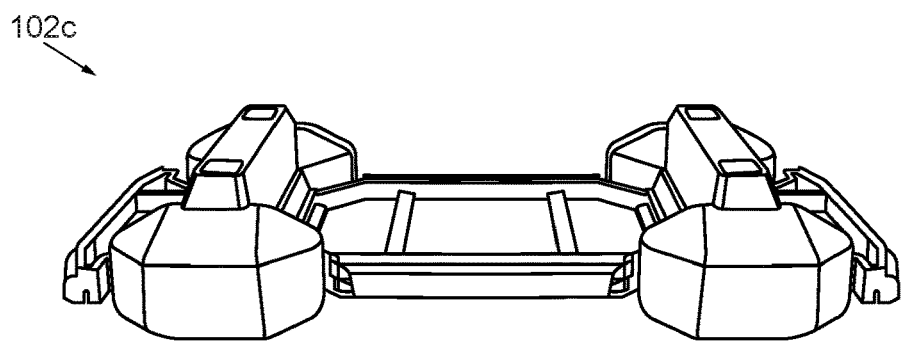
Figure 4C:
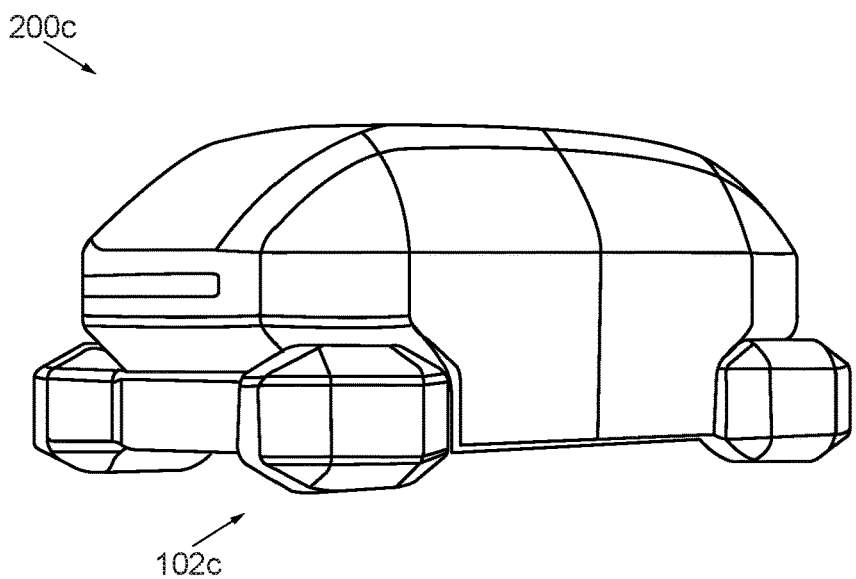

Further, as FIG. 4C references, the assembly 100 allows for transport of a passenger vehicle platform container 200c. As shown in FIG. 4A, the passenger vehicle platform container 200c may include a car, truck, boat, or taxi used to carry passengers. The passenger vehicle platform container 200c is controlled and carried by a platform container 102c that receives and mates with the passenger vehicle platform container 200c (FIG. 4B). The combination allows for transporting passengers in an efficient, autonomous manner. This is one example of a different theme for the platform container, which is a unique feature of the present invention.

Figure 7:
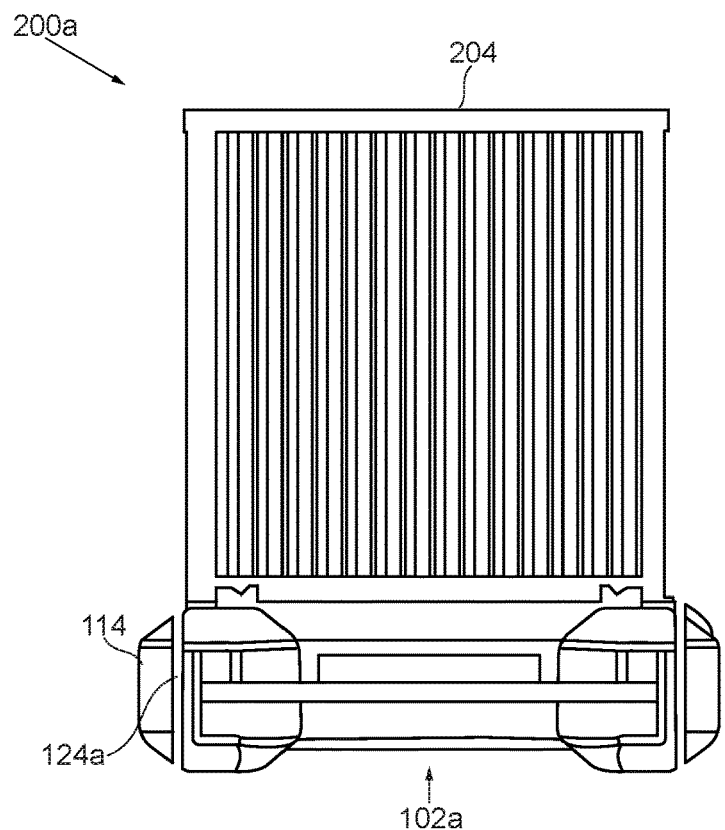
FIG. 7 illustrates a frontal view of an exemplary mobile platform carrying a cargo-type platform container, in accordance with an embodiment of the present invention.

However, as discussed above, the primary platform container 200a is the rectangular cargo type (FIG. 6), known in the art. The unique shape is configured to carry items, such as boxes, garments, foodstuff, barrels, and general trade inventory. The platform container 200a is sized and dimensioned to fit square onto the mobile platform 102a with minimal overlap. The mating configuration between the mobile platform 102a and the platform container 200a, may be through a magnet, a mechanical fastener, or simply the weight of the platform container 200a creating a friction fit mating configuration, as shown in FIG. 7.

For example, as shown in FIG. 8, the platform container 200a may be a standard shipping container of 8', 20' or 40' lengths, with a rectangular shape. Such containers are used for carrying cargo from ships, trains, semi-trucks, and finally to the mobile platform 102a for autonomous, remote transport to a final destination.

Figure 9:
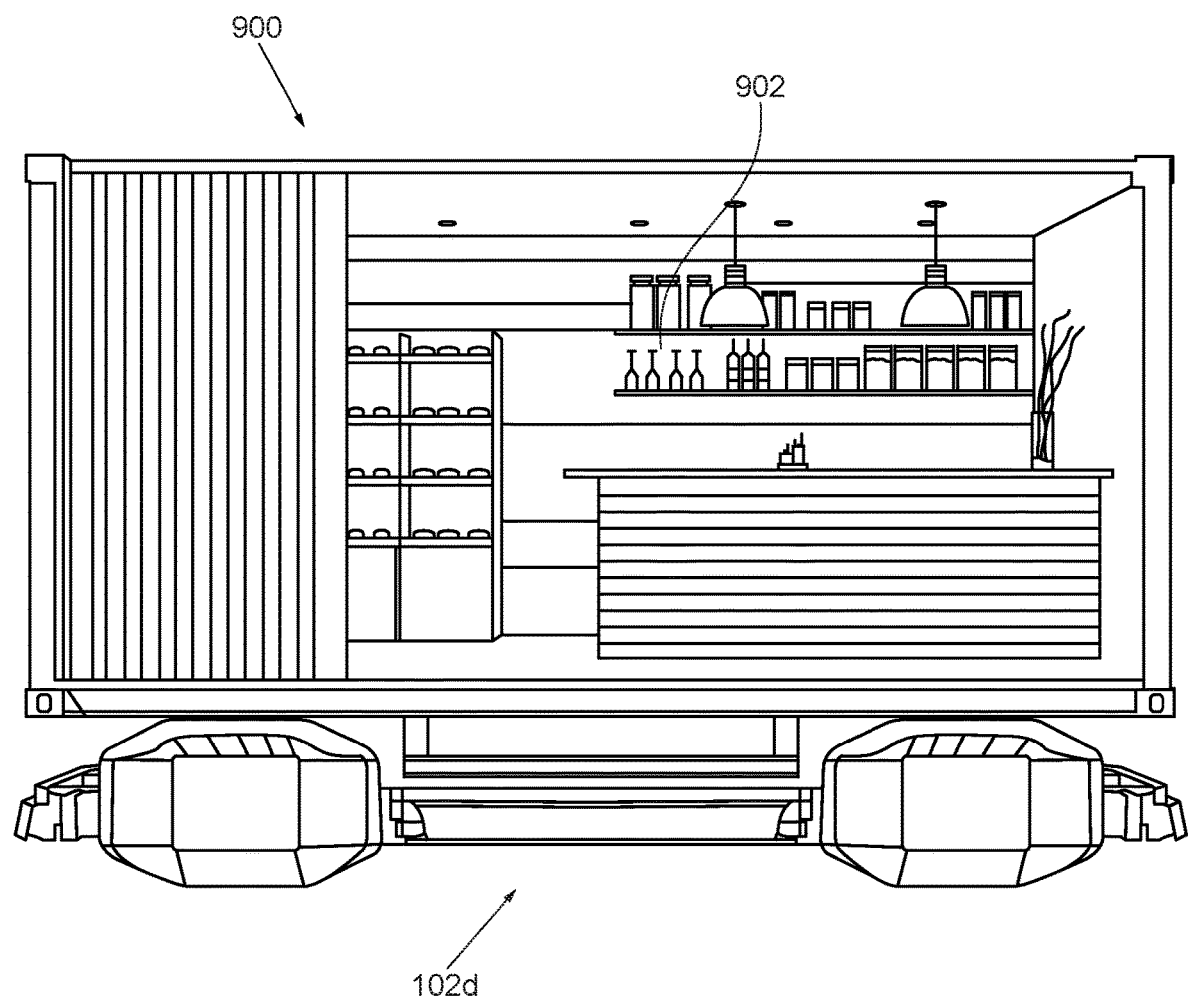
FIG. 9 illustrates an exemplary food distribution platform container, in accordance with an embodiment of the present invention.

As discussed above, the cavity in the platform container 200a can have numerous themes that allow for customizing the assembly 100 for different uses. The voluminous configuration allows for storage of multiple container items and/or passengers in different capacities. In one possible embodiment, a food distribution platform container 900 is defined by a food and drink dispensing area being carried by the mobile platform 102d (FIG. 9).

In some embodiments, the container item 902 in this capacity may include food service-related items, such as food, beverages, glass, plates, cooking utensils, and eating utensils. The passenger(s) in the food and drink dispensing area may include a cook, a server, a host, and a food customer. In one non-limiting embodiment, the food distribution platform container 900 may include a mobile restaurant or a food delivery vehicle. However, any other food and beverage related service or production can be used in the food and drink dispensing area.

Figure 10:
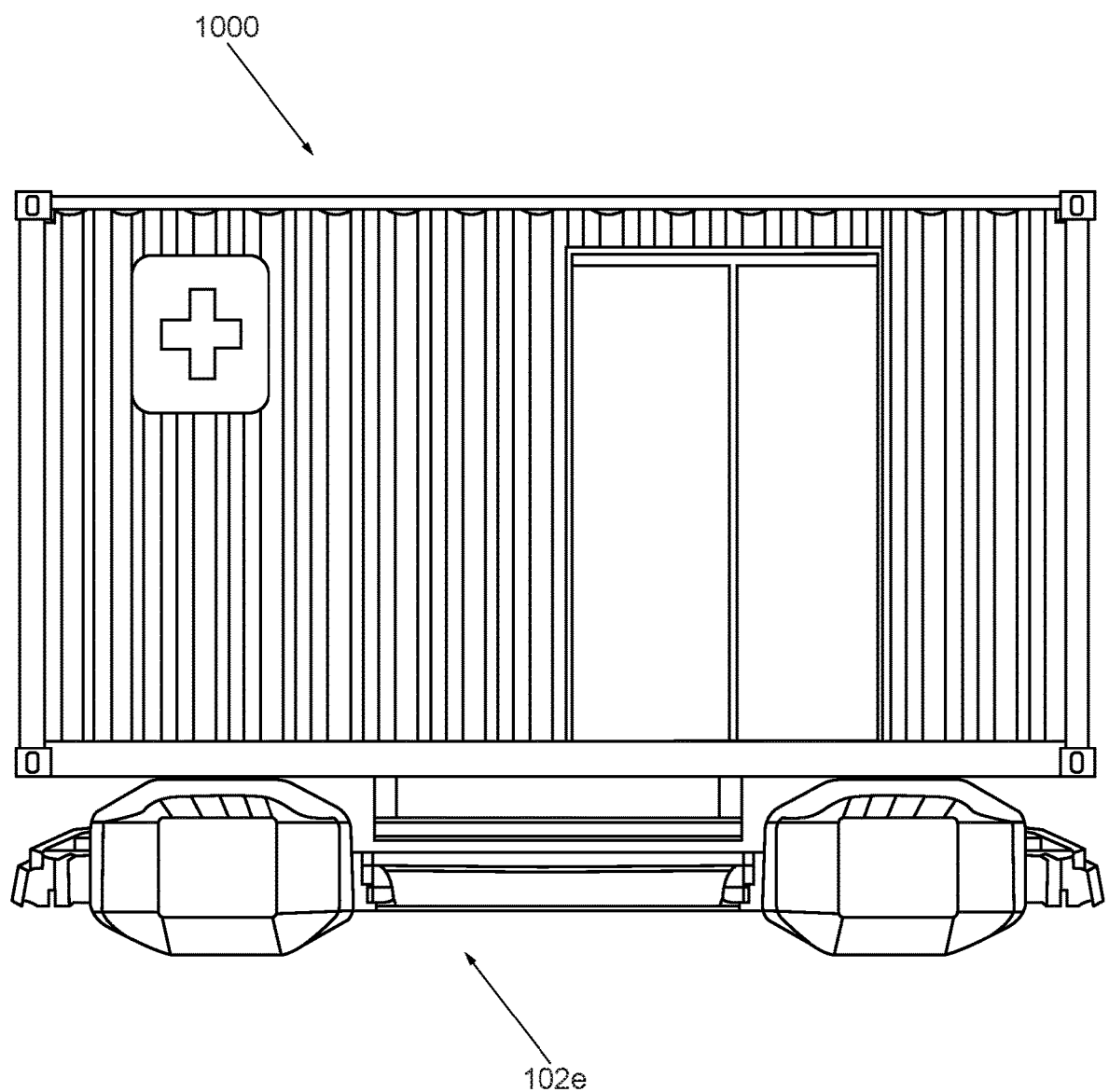
FIG. 10 illustrates an exemplary medical assistance platform container, in accordance with an embodiment of the present invention.

In another embodiment shown in FIG. 10, the platform container 1000 is defined by a medical assistance dispensing area being carried by the mobile platform 102e. For purposes of providing medical assistance in the cavity, the medical assistance platform container 1000 includes a bed, a medicine, a bandage, and surgery equipment. However, other medical-related supplies may also be included in the medical assistance dispensing area. The possible passengers in the medical assistance dispensing area may include a medical professional and a patient. For example, the medical assistance dispensing area In another embodiment, a home platform container 1100 is defined by a home area that is habitable while also being carried by the mobile platform 102f As depicted in FIG. 11, the home area configuration can be carried by the mobile platform 102f to a parking area having a dedicated utility. The cavity contains at least one container item 1102, such as a bed, a table, a sofa, a light, a sink, a cooking device, and a toilet, and other creature comforts that make the home area more habitable. The passenger in the home area include an inhabitant, and guests thereof. Since the home platform container 1100 requires energy to be habitable, at least one solar panel 1104 may be used directly thereon.

Figure 12:
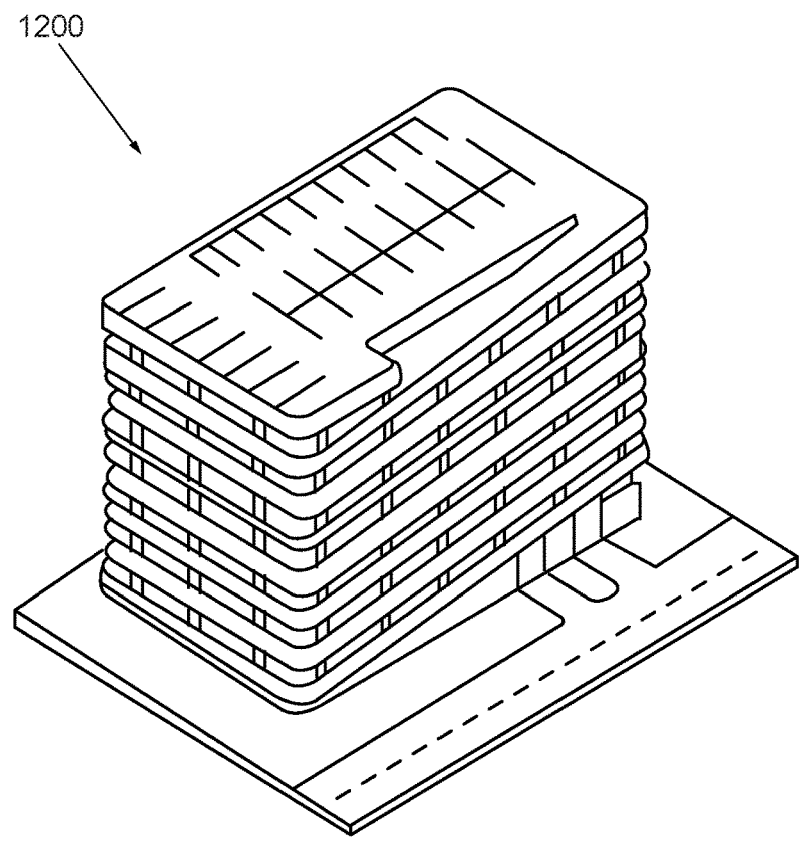
FIG. 12 illustrates an exemplary high-rise building for parking a home platform container, in accordance with an embodiment of the present invention.
Figure 13:
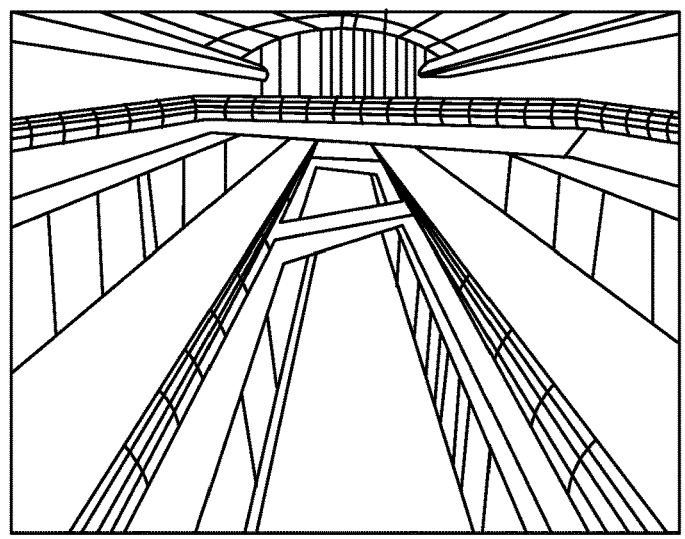
FIG. 13 illustrates an exemplary shopping area in the high-rise building, in accordance with an embodiment of the present invention.
Figure 14:
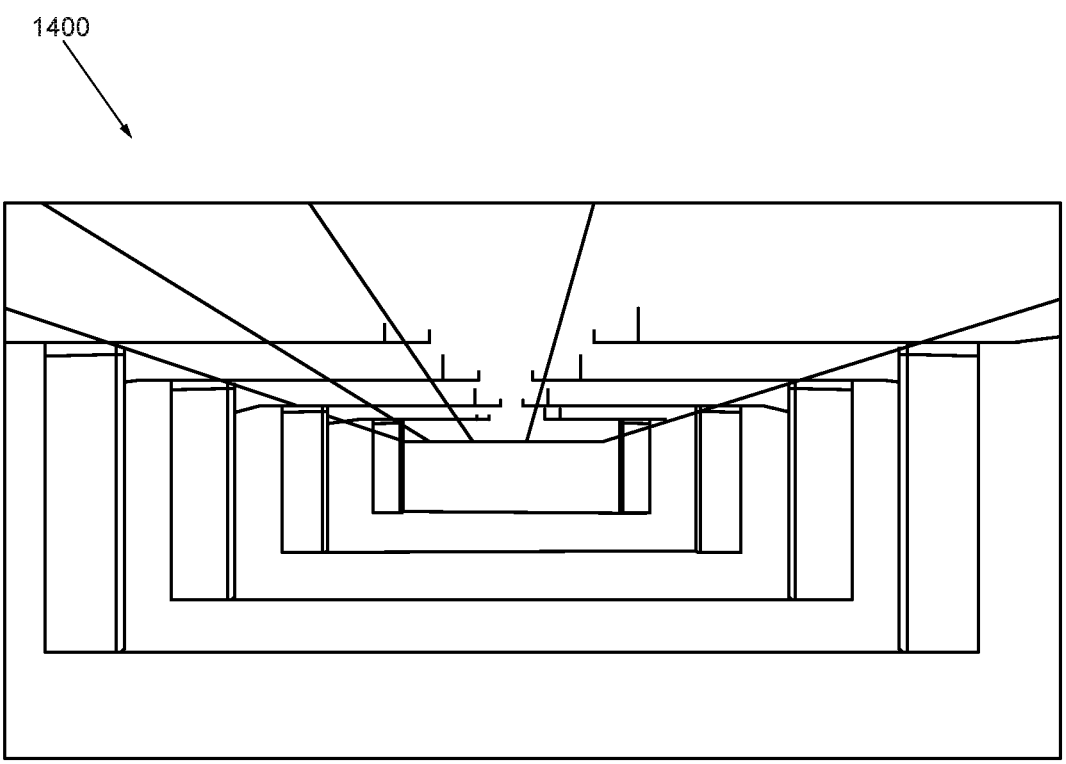
FIG. 14 illustrates an exemplary parking area designed to park the home platform container, in accordance with an embodiment of the present invention.
Figure 15:
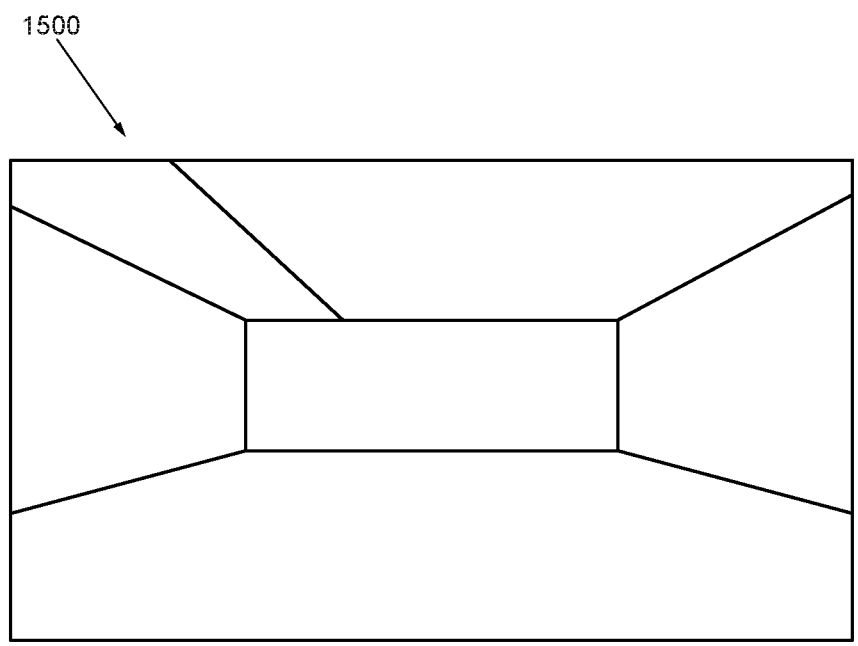
FIG. 15 illustrates an exemplary parking area may be divided into individual lots, in accordance with an embodiment of the present invention.
Figure 16:
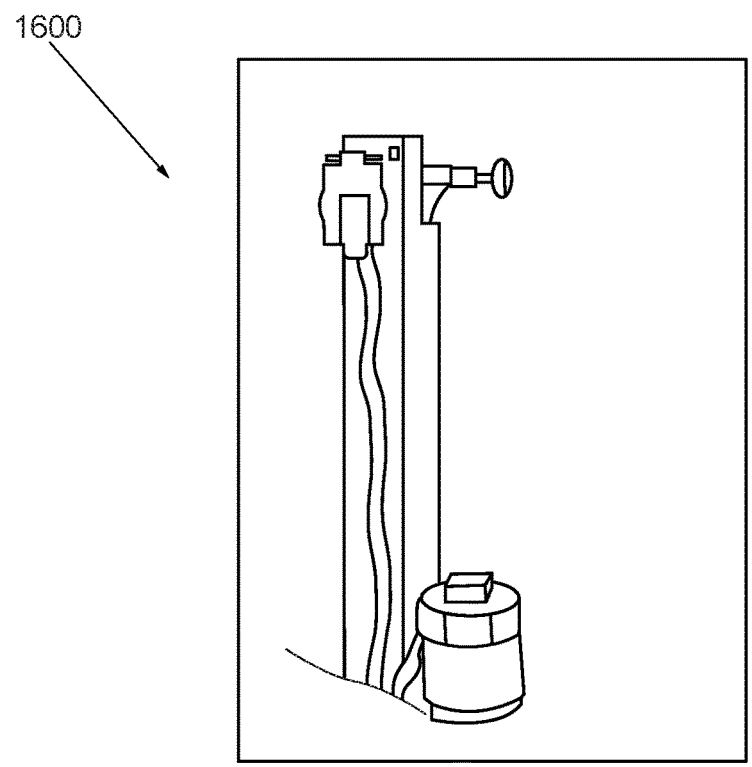
FIG. 16 illustrates an exemplary utility post, carrying electricity and/or water, in accordance with an embodiment of the present invention.

Operation of the home platform container 1100 is referenced in FIGS. 12-20. A user may park the home platform container 1100 in a high-rise building 1200 having dedicated parking space for the mobile platform 102f and the home platform container 1100. This is a special high rise dedicated to the home platform container 1100 (FIG. 12). Turning now to FIG. 13, inside each high-rise building 1200 is a shopping area 1300 where the inhabitant can shop, eat, and transact business. Furthermore, the home platform container 1100 has a parking area 1400 designed to park the home platform container 1100 and the mobile platform 102f (FIG. 14) As FIG. 15 shows, a parking area may be divided into individual lots 1500. Further, a utility post 1600, carrying electricity and/or water is located at each individual lot 1500 to provide electricity and water necessary for habitation (FIG. 16).

Figure 17:
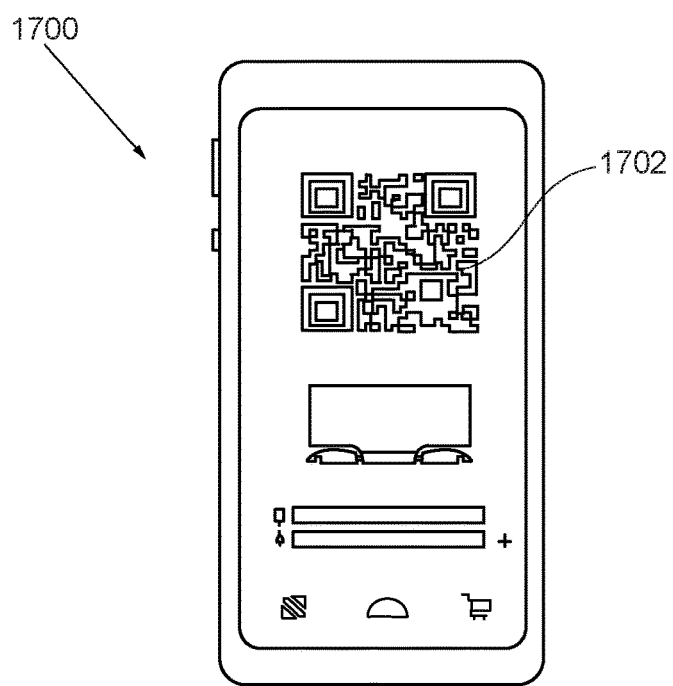
FIG. 17 illustrates an exemplary a mobile communication device, such as a smart phone or tablet, to control movement and habitable operation, in accordance with an embodiment of the present invention.
Figure 18:
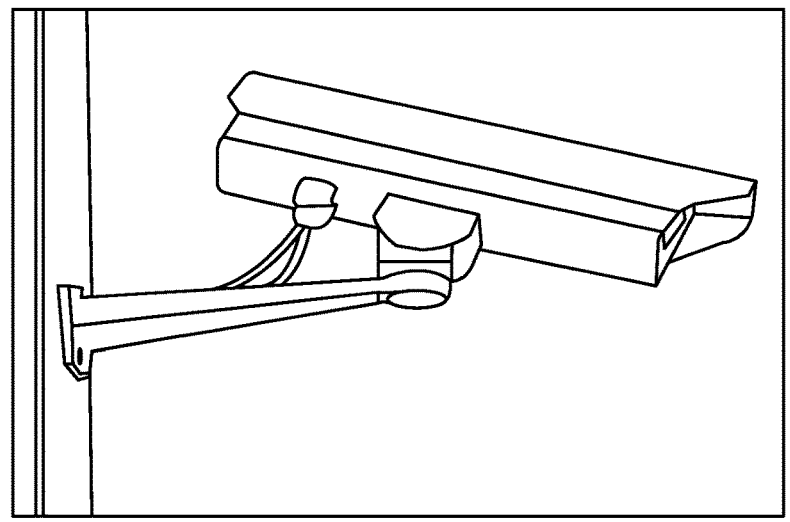
FIG. 18 illustrates an exemplary a surveillance camera inside the individual lots, in accordance with an embodiment of the present invention.

As discussed above, the assembly 100 allows the mobile platform 102f to be controlled remotely. Thus, as shown in FIG. 17, a user can utilize a mobile communication device 1700, such as a smart phone or tablet, to control movement and habitable operation of the mobile platform 102f, and the home platform container 1100 resting thereon. As a security measure, the user is prevented from accessing the mobile platform 102f unless a passcode 1702, such as a bar code, or blockchain sequence is entered.

In this manner, the user can also scan a license plate on the mobile platform 102f to verify ownership, or unlock the mobile platform 102f or the home platform container 1100, for operation thereof. Additional security, shown in FIG. 18, may include a surveillance camera 1800 inside the individual lots 1500. A central security office can monitor, or the user can monitor the home platform container 1100 with the mobile communication device 1700.

Figure 19:
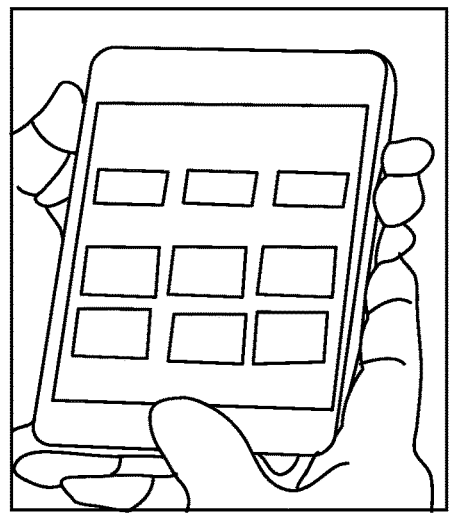
FIG. 19 illustrates an exemplary intelligent features of home platform container accessible with the mobile communication device, in accordance with an embodiment of the present invention.
Figure 20:
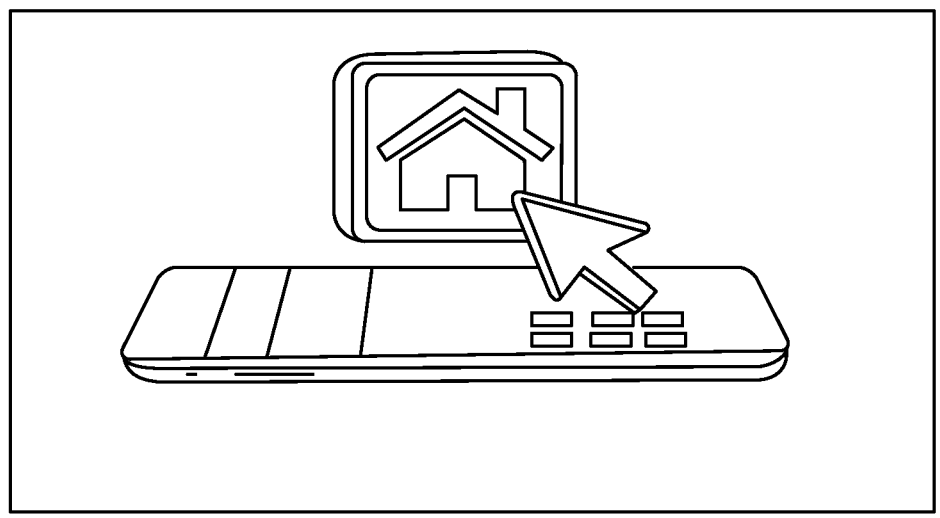
FIG. 20 illustrates an exemplary a dedicated communication protocol between home platform container and communication device, in accordance with an embodiment of the present invention.

Turning now to FIG. 19, the assembly 100 provides additional intelligent features 1900 of the home platform container 1100 that can be accessed and controlled remotely by the user with the mobile communication device 1700. This can include temperature control, electricity powering, security monitoring, and entertainment system controls. As referenced in FIG. 20, this unique capacity to control the home platform container 1100 with the mobile communication device includes a dedicated communication protocol 2000 between home platform container 1100 and communication device.

In conclusion, the intelligent autonomous electrical vehicle platform assembly 100 provides a mobile platform 102a that comprises a self-motorized, electrical power drive to carry at least one platform container 200a or passenger vehicle 200c while being controlled remotely by an operator, or autonomously driven through artificial intelligence, or operated in a shared transportation system. The mobile platform has a platform chassis having wheels with a hub motor assembly contained therein. The hub motor is powered electrically from a battery charged by an external power source and/or a solar panel. The mobile platform carries a platform container that forms an enclosed area with various themes, including: a cargo transport area, a food and beverage area, a medical assistance area, or a home area having an inhabitant-assigned parking area and utility. The inhabitant of the mobile home receives creature comforts of a home environment, and controls movement, parking, energy, temperature, and payment options for the mobile home.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An intelligent autonomous electrical vehicle platform assembly for cargo transport and mobile housing, the assembly comprising:
    at least one mobile platform having:
        a platform chassis defined by a front end, a rear end, a platform support face, and a platform under face, the platform chassis comprising at least one front wheel disposed near the front end and at least one rear wheel disposed near the rear end, the front and rear wheels being operable with a wheel hub assembly;
        at least one suspension system operatively connected to at least one of the front and rear wheels;
        at least one hub motor operational with the wheel hub assembly, each hub motor operational to drive a respective wheel, the hub motor being operational with electrical energy;
        a battery operatively connected to the hub motor, the battery generating electrical energy;
        a charge port being operatively connected to the battery, the charge port operable to enable passage of an electrical charge;
        an illumination portion;
        and a computer operating a software program;
        whereby the software program is operational to control at least one of the following: the hub motor, the illumination portion, the battery; and
    at least one platform container defined by a forward container end and a rearward container end, the platform container detachably coupled and aligned longitudinally with the mobile platform, the platform container operable to contain at least one container item, or a passenger, or both, the platform container having:
        a container base wall detachably mated with the platform support face;
        a container roof wall disposed in a spaced-apart, parallel relationship with the container base wall;
        a sidewall disposed to enclose, with the container base wall and the container roof wall, a cavity; and
        at least one gate being operable in the sidewall, the gate regulating access to the cavity.

2. The assembly of claim 1, wherein the mobile platform comprises at least one solar panel disposed on the platform chassis, the solar panel being operatively connected to the battery for recharging the battery.

3. The assembly of claim 1, wherein the mobile platform comprises a power inverter operable to convert direct current to alternating current.

4. The assembly of claim 1, wherein the charge port enables passage of a cable for charging the battery.

5. The assembly of claim 1, wherein the software program is in communication with a firmware, a remote server, and a customer service department.

6. The assembly of claim 1, wherein the software program enables autonomous operation by the mobile platform.

7. The assembly of claim 1, wherein the software program is defined by artificial intelligence logic.

8. The assembly of claim 1, wherein the software program is operable on a mobile communication device.

9. The assembly of claim 8, wherein the mobile communication device is operable by a user to control movement of the mobile platform.

10. The assembly of claim 1, wherein the mobile platform comprises a steering member operatively connected to the front wheel, or the rear wheel, or both.

11. The assembly of claim 1, wherein the hub motor is encompassed inside the front wheel, or the rear wheel, or both.

12. The assembly of claim 1, wherein the illumination portion comprises an LED light.

13. The assembly of claim 1, wherein the gate is disposed at the forward container end.

14. The assembly of claim 1, wherein the gate comprises a lock.

15. The assembly of claim 1, wherein the cavity in the platform container is defined by a food and drink dispensing area, whereby the container item includes at least one of the following: a food, a beverage, a glass, a plate, a cooking utensil, and an eating utensil, and whereby the passenger includes at least one of the following: a cook, a server, and a host.

16. The assembly of claim 1, wherein the cavity in the platform container is defined by a medical assistance dispensing area, whereby the container item includes at least one of the following: a bed, a medicine, a bandage, and whereby the passenger includes at least one of the following: a medical professional and a patient.

17. The assembly of claim 1, wherein the platform container is defined by a home area, whereby the container item includes at least one of the following: a bed, a table, a sofa, a light, a sink, a cooking device, and a toilet, and whereby the passenger includes an inhabitant.

18. An intelligent autonomous electrical vehicle platform assembly for cargo transport and mobile housing, the assembly comprising:
    at least one mobile platform having:
        a platform chassis defined by a front end, a rear end, a platform support face, and a platform under face, the platform chassis comprising at least one front wheel disposed near the front end and at least one rear wheel disposed near the rear end, the front and rear wheels being operable with a wheel hub assembly;
        at least one suspension system operatively connected to at least one of the front and rear wheels;
        at least one hub motor operational with the wheel hub assembly, each hub motor operational to drive a respective wheel, the hub motor being operational with electrical energy;
        a battery operatively connected to the hub motor, the battery generating electrical energy;
        at least one solar panel disposed on the platform chassis, the solar panel being operatively connected to the battery for recharging the battery;
        a power inverter operable to convert direct current to alternating current;
        a charge port being operatively connected to the battery, the charge port operable to enable passage of an electrical charge;
        an illumination portion;
        and a computer operating a software program;
        whereby the software program is operational to control at least one of the following: the hub motor, the illumination portion, the battery; and
    at least one platform container defined by a forward container end and a rearward container end, the platform container detachably coupled and aligned longitudinally with the mobile platform, the platform container operable to contain at least one container item, or a passenger, or both, the platform container having:

a container base wall detachably mated with the platform support face;

a container roof wall disposed in a spaced-apart, parallel relationship with the container base wall;

a sidewall disposed to enclose, with the container base wall and the container roof wall, a cavity; and at least one gate being operable in the sidewall of the platform container, the gate regulating access to the cavity.

19. The assembly of claim 18, wherein the platform container is defined by a home area, whereby the container item includes at least one of the following: a bed, a table, a sofa, a light, a sink, a cooking device, and a toilet, and whereby the passenger includes an inhabitant.

20. An intelligent autonomous electrical vehicle platform assembly for cargo transport and mobile housing, the assembly comprising:

at least one mobile platform having:

a platform chassis defined by a front end, a rear end, a platform support face, and a platform under face, the platform chassis comprising at least one front wheel disposed near the front end and at least one rear wheel disposed near the rear end, the front and rear wheels being operable with a wheel hub assembly;

a steering member operatively connected to the front wheel, or the rear wheel, or both;

at least one suspension system operatively connected to at least one of the front and rear wheels;

at least one hub motor operational with the wheel hub assembly, each hub motor operational to drive a respective wheel, the hub motor being operational with electrical energy;

a battery operatively connected to the hub motor, the battery generating electrical energy;

a charge port being operatively connected to the battery, the charge port operable to enable passage of an electrical charge;

an illumination portion;

and a computer operating a software program;

whereby the software program is operational to control at least one of the following: the hub motor, the illumination portion, the battery; and at least one platform container detachably coupled and aligned longitudinally with the mobile platform, the platform container operable to contain at least one container item, or a passenger, or both, the platform container having:

a container base wall detachably mated with the platform support face;

a container roof wall disposed in a spaced-apart, parallel relationship with the container base wall;

a sidewall disposed to enclose, with the container base wall and the container roof wall, a cavity, whereby the cavity in the platform container is defined by at least one of the following:

a food and drink dispensing area, whereby the container item includes at least one of the following: a food, a beverage, a glass, a plate, a cooking utensil, and an eating utensil, and whereby the passenger includes at least one of the following: a cook, a server, and a host;

a medical assistance dispensing area, whereby the container item includes at least one of the following: a bed, a medicine, a bandage, and whereby the passenger includes at least one of the following: a medical professional and a patient;

a home area, whereby the container item includes at least one of the following: a bed, a table, a sofa, a light, a sink, a cooking device, and a toilet, and whereby the passenger includes an inhabitant; and at least one gate being operable in the sidewall of the platform container, the gate regulating access to the cavity.

* * * * *